US012759208B2

(12) United States Patent
Venturi et al.

(10) Patent No.: US 12,759,208 B2
(45) Date of Patent: Oct. 13, 2026

(54) EXTRUDER AND METHOD FOR PERFORMING A DIAGNOSTIC INVESTIGATION IN AN EXTRUDER

(71) Applicant: SACMI COOPERATIVA MECCANICI IMOLA SOCIETA' COOPERATIVA, Imola (IT)

(72) Inventors: Fillippo Venturi, Imola (IT); Davide Baldisserri, Imola (IT); Stefano Bergami, Castel San Pietro Terme (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 615 days.

(21) Appl. No.: 18/006,443

(22) PCT Filed: Aug. 5, 2021

(86) PCT No.: PCT/IB2021/057196

§ 371 (c)(1),
(2) Date: Jan. 23, 2023

(87) PCT Pub. No.: WO2022/029676

PCT Pub. Date: Feb. 10, 2022

(65) Prior Publication Data

US 2023/0264408 A1 Aug. 24, 2023

(30) Foreign Application Priority Data

Aug. 7, 2020 (IT) ........................ 102020000019633

(51) Int. Cl.
*B29C 48/92* (2019.01)

(52) U.S. Cl.
CPC .... *B29C 48/92* (2019.02); *B29C 2948/92019* (2019.02); *B29C 2948/92047* (2019.02);
(Continued)

(58) Field of Classification Search
CPC ... B29C 48/92; B29C 48/832; B29C 45/7666; B29C 45/7646
See application file for complete search history.

(56) References Cited

U.S. PATENT DOCUMENTS 5,122,315 A 6/1992 Darley
6,492,485 B1 12/2002 Gohr
(Continued)

FOREIGN PATENT DOCUMENTS

CN 101890792 A 11/2010
CN 104955631 A 9/2015
(Continued)

OTHER PUBLICATIONS

Office action with machine English translation from Japanese Patent Application No. 2023-507858, Date of Drafting: Jan. 30, 2024, 8 pages.

(Continued)

*Primary Examiner* — Lam S Nguyen
(74) *Attorney, Agent, or Firm* — Chrisman Gallo Tochtrop LLC

(57) ABSTRACT

An extruder for polymeric materials, includes: a hollow extrusion cylinder, having an inlet for receiving pellets of polymeric material, and an outlet for expelling molten polymeric material; an extruder screw connected to a motor to rotate inside the extrusion cylinder and to move the polymeric material from the inlet to the outlet; heaters coupled to the extrusion cylinder; a sensor system configured to measure values of a recipe parameter and of a monitoring parameter; a processing unit, programmed to store a target value for the recipe parameter and to perform a feedback control to bring the recipe parameter to the target value and to keep it at the target value.

20 Claims, 4 Drawing Sheets

(52) U.S. Cl.
CPC ............... *B29C 2948/92095* (2019.02); *B29C 2948/92209* (2019.02); *B29C 2948/924* (2019.02); *B29C 2948/92704* (2019.02); *B29C 2948/92895* (2019.02)

(56) References Cited

U.S. PATENT DOCUMENTS

| | | | | |
|---|---|---|---|---|
| 8,182,724 | B2 * | 5/2012 | Zhang | B29C 45/7666 264/40.6 |
| 11,067,504 | B2 | 7/2021 | Bosi | |
| 2010/0295199 | A1 | 11/2010 | Zhang et al. | |
| 2017/0246789 | A1 | 8/2017 | Siebigteroth et al. | |
| 2018/0128738 | A1 | 5/2018 | Bosi | |
| 2022/0170426 | A1 * | 6/2022 | Prochazka | F02B 37/18 |

FOREIGN PATENT DOCUMENTS

| | | | |
|---|---|---|---|
| DE | 10 2006 019 445 | A1 | 10/2007 |
| EP | 0 838 326 | A1 | 4/1998 |
| EP | 3 210 748 | A1 | 8/2017 |
| JP | 2003191231 | A | 7/2003 |
| JP | 2003530478 | A | 10/2003 |
| JP | 2010149481 | A | 7/2010 |
| JP | 2018521878 | A | 8/2018 |
| WO | 01/24991 | A1 | 4/2001 |
| WO | 0177206 | A1 | 10/2001 |
| WO | 2004/080684 | A1 | 9/2004 |
| WO | 2014/118243 | A1 | 8/2014 |
| WO | 2015/092644 | A1 | 6/2015 |
| WO | 2016/181361 | A1 | 11/2016 |
| WO | 2018/025150 | A1 | 2/2018 |
| WO | 2020/074743 | A1 | 4/2020 |

OTHER PUBLICATIONS

International Search Report and Written Opinion for corresponding International Application No. PCT/IB2021/057196 mailed Nov. 22, 2021.

Hobson Wes et al., "What is Your Extruder Trying to Tell You?", PTONLINE, Plastics Technology Online, Jan. 23, 2018, pp. 1-3, XP055798505; Retrieved from the Internet: URL: https://www.ptonline.com/articles/what-is-your-extruder-trying-to-tell-you [retrieved on Apr. 23, 2021] (cited on p. 2 of the specification).

* cited by examiner

EXTRUDER AND METHOD FOR PERFORMING A DIAGNOSTIC INVESTIGATION IN AN EXTRUDER

CROSS-REFERENCE TO RELATED APPLICATIONS

This is a National Stage application of PCT international application PCT/IB2021/057196 filed on Aug. 5, 2021, which claims the priority of Italian Patent Application No. 102020000019633, filed Aug. 7, 2020, which are incorporated herein by reference in their entireties.

TECHNICAL FIELD

The invention relates to an extruder for polymeric materials. This disclosure also relates to a method for performing a diagnostic investigation in an extruder for polymeric materials. This disclosure also relates to a method for extruding polymeric materials. This disclosure also relates to a diagnostic system for an extruder.

This disclosure therefore addresses the field of extruders for polymeric materials; more specifically, this disclosure addresses the technical field of extruders configured to feed injection or compression moulding machines.

BACKGROUND ART

An extruder of this kind is described, for example, in patent document WO018025150 in the name of the present Applicant. Another extruder for polymeric materials is described in patent document WO2016181361A in the name of the present Applicant; the extruder described in that document comprises one or more sensors configured to monitor properties of the polymeric material inside it.

Typically, extruders are supplied with charges of plastic material (for example from silos or bags); in this context, there is the need to promptly identify faults in loading the material. For example, when one charge of a first material is finished, a second charge of a second material, different from the first, may be loaded by mistake. It is therefore necessary to identify an unforeseen change of material. Moreover, even if the material of the second charge loaded when the first charge is finished is the first material, its properties may be different from the first material of the first charge; the different properties may be due, for example, to the fact that the second charge may be from a manufacturer and/or manufacturing plant different from that of the first charge; the different properties might also be due to contaminants or defects in the second charge or to unsuitable storage conditions (for example, the second charge may have been stored in an excessively damp place). It is therefore necessary to identify an unforeseen change in the properties of the material.

Therefore a need felt in the field of extruders is that of promptly detecting unforeseen changes of material or material properties. Furthermore, since the behaviour of the material in the extruder is also affected by the state of wear of the extruder, another need is that of being able to distinguish between changes of behaviour due to the material from changes of behaviour due to extruder wear, hence to detect problems due to wear, so as to be able to plan maintenance and replacement of worn components. Yet another need is that of being able to detect other extruder problems such as a broken mixer for example, so that specific maintenance can be carried out.

Some examples about extruders are provided in the following patent documents: WO2016181361A1, DE102008019445A1, U.S. Pat. No. 5,122,315A, WO01/77206A1, WO2020/074743A1 and EP3210748A1. Furthermore, some information about extruders can be found in the following article: Hobson Wet ET AL: "What is Your Extruder try to tell you?", PTONLINE, XP055798505.

DISCLOSURE OF THE INVENTION

The aim of this disclosure is to provide an extruder and a method for performing a diagnostic investigation in an extruder for polymeric materials to overcome one or more of the above mentioned drawbacks of the prior art.

This aim is fully achieved by the extruder and the method for performing a diagnostic investigation in an extruder for polymeric materials according to this disclosure as characterized in the appended claims.

This disclosure therefore relates to an extruder for extruding polymeric materials, or plastics. Examples of polymeric materials are polypropylene and polyethylene.

The extruder comprises a hollow extrusion cylinder. The hollow extrusion cylinder has an inlet for receiving pellets of polymeric material, and an outlet for expelling molten polymeric material. The extrusion cylinder extends elongatedly in a longitudinal direction. More specifically, the extrusion cylinder extends elongatedly from the inlet to the outlet.

The extruder comprises an extruder screw. The extruder screw is connected to a motor which drives it in rotation inside the extrusion cylinder to move the polymeric material from the inlet towards the outlet. Thus, the rotation of the extruder screw causes the polymeric material to move from the inlet towards the outlet.

The extruder comprises heaters coupled to the extrusion cylinder. More specifically, the heaters comprise electrical heating elements. The heaters are configured to heat the polymeric material inside the extrusion cylinder. In one or more embodiments, the extruder comprises a pushing device. The pushing device is configured to move the molten polymeric material fed by the screw to make it available to a moulding machine for making polymeric objects.

In an embodiment, the pushing device includes a pump; in this case, the molten polymeric material is fed continuously to the moulding machine, which is preferably a compression moulding machine. The function of the pump is to ensure that the material is expelled from the extruder and fed to the moulding machine at a constant rate; in effect, without a pump, the flow rate of the material would be fluctuating on account of the inherent features of the extruder; in some applications, such fluctuations are unacceptable and the use of a pump is therefore preferred.

In another embodiment, the pushing device includes an injection piston movable by translation in a chamber between a withdrawn position and an advanced position; in this case, the molten polymeric material is fed intermittently to the moulding machine, which is preferably an injection moulding machine. Whatever the case, the pushing device, where provided, includes a motor (preferably electric) configured to drive the pump or the injection piston.

In one or more embodiments, however, the pushing device is not provided and the molten material is fed from the outlet of the extruder directly to the machine which processes the material to make an object or other product. If the machine downstream of the extruder is a compression moulding machine, the absence of the pushing device results in less dimensional precision of the objects made; nevertheless, this lesser precision may be acceptable in some applications. In this context, if the machine downstream of the extruder is an injection moulding machine, the axial movement of the extruder screw may serve the function of pushing the material out of the extrusion cylinder (instead of the pushing device); in this case, after pushing a dose of material out of the cylinder, the screw must remain at the advanced position until the mould is completely full; this limits the speed of the machine but may nevertheless be acceptable in some contexts.

Furthermore, the pushing device is not necessary even in the case where the extruder is configured to feed the polymeric material to a lining machine. Lining machines are machines that produce doses of polymeric material which are then applied to the inside of closures (for example, crown caps or jar lids) to improve closure seal. In these machines, fluctuations in the flow rate of the material fed by the extruder are tolerable. Such lining machines are described, for example, in patent documents WO2004080684, EP0838326 and WO2015092644, incorporated herein by reference.

In this context, this disclosure may also provide a system comprising the extruder and a machine configured to receive the molten material from the extruder. The machine configured to receive the molten material from the extruder may be a compression moulding machine, an injection moulding machine, an injection compression moulding machine or a lining machine. The extruder comprises a sensor system. The sensor system is configured to measure values of an (at least one) recipe parameter and of an (at least one) monitoring parameter. It should be noted that the sensor system may be configured to measure values of a plurality of recipe parameters; the sensor system may be configured to measure values of a plurality of monitoring parameters.

The extruder comprises a processing unit. The processing unit is programmed to store a target value for the recipe parameter and to perform a feedback control to bring the recipe parameter to the target value and to keep it at the target value. Thus, by recipe parameter is meant a parameter for which a target value can be set and which must remain near or at the target value. By monitoring parameter, on the other hand, is generically meant a parameter that is measured by the sensor system.

The processing unit is programmed to perform a feedback control on (at least) a control parameter so as to keep the recipe parameter at the target value. In an embodiment, the control parameter coincides with the monitoring parameter; in another embodiment, the control parameter is additional to the monitoring parameter. The sensor system is preferably configured to also measure the control parameter.

The heaters are connected to and controlled by the processing unit. The heaters are configured to receive command signals from the processing unit. The control signals are representative of an amount of heat to be transferred from the heaters to the extruded material.

More specifically, in an embodiment, the processing unit is configured to control the heaters by feedback to bring the recipe parameter to the target value and keep it there. In this embodiment, therefore, the control parameter is a parameter connected with the operation of the heaters. As described below, there may be other feedback controls (in addition or alternative to the control of the heaters) which act on other control parameters such as, for example, the power of the pushing device motor and/or the speed of rotation of the screw.

In particular, in an example, the processing unit is configured to receive the control parameter which is a control temperature, representative of a temperature of the extruded material. The processing unit is configured to compare the control temperature with a predetermined temperature value. The processing unit is configured to send command signals to the heaters based on the comparison performed. Said command signals will command the heaters to increase the quantity of heat transmitted to the material if the control temperature is lower than the predetermined value, while they will reduce the heat transmitted if the control temperature is greater than the predetermined value.

Preferably, the processing unit is programmed to process a first value of the monitoring parameter, measured (or captured or derived) at a first time instant, and a second value of the monitoring parameter, measured (or captured or derived) at a second time instant, after the first time instant, and is programmed to generate alert data in response to a comparison between the first and the second monitoring parameter value. In an embodiment, the extruder includes an alarm system; the processing unit is configured to activate the alarm system as a function of the alarm, data. The alarm system may include a siren, a warning light and/or a video interface on which a message for an operator is displayed.

In an embodiment, the first value of the monitoring parameter and the second value of the monitoring parameter are derived by the processing unit by calculating a moving average; the moving average is an average of values movable over time in a time window of predetermined size (for example, 60 seconds). Thus, the first value is given by the average, calculated at the first time instant, of the values adopted by the monitoring parameter in the time window immediately preceding the first time instant; the second value is given by the average, calculated at the second time instant, of the values adopted by the monitoring parameter in the time window immediately preceding the second time instant.

Calculating the moving average has the advantage of reducing noise—that is, of minimizing random variations in the monitoring parameter value, not due to causes such as anomalies in the material or wear; that way, the variations that are due to causes such as anomalies in the material or wear are made more evident.

In an embodiment, the processing unit has access to a memory containing reference data representing an intensity (or extent) of variation in the monitoring parameter and the processing unit is programmed to generate alert data in response to comparing the variation between the first and the second value of the monitoring parameter with the reference data. For example, the reference data might include a maximum allowable difference between the monitoring parameter at the first time instant and at the second time instant; if the variation in the monitoring parameter is greater than the maximum allowable difference, the processing unit is configured to generate alert data.

In an embodiment, the processing unit is programmed to detect variations in the target value of the recipe parameter. For example, the recipe parameter is settable by an operator; variations in the recipe parameter may be due to the fact that the operator enters a new recipe parameter when a new material is loaded. The processing unit is programmed to generate alert data also as a function of an absence of variations in the target value for the recipe parameter between the first and the second time instant. Thus, the processing unit generates alert data if there has been a variation in the monitoring parameter between the first and the second time instant but without any variation in the recipe parameter. In effect, variations in the monitoring parameter unaccounted for by a variation in the recipe parameter may be due to anomalies in the material—that is, to an unexpected change of material or in the properties thereof.

In an embodiment, the processing unit is programmed to generate alert data also as a function of a duration of the time interval between the first and the second time instant. More specifically, the processing unit is programmed to generate alert data as a function of comparing the duration of the time interval between the first and the second time instant with a predetermined value (for example, a week or a month). In effect, if the duration of the time interval between the first and the second time instant is less than the predetermined value, the processing unit is programmed to assign a variation, if any, in the monitoring parameter (or in the plurality of monitoring parameters) to an anomaly in the polymeric material; on the other hand, if the duration of the time interval between the first and the second time instant is greater than the predetermined value, the processing unit is programmed to assign a variation, if any, in the monitoring parameter (or in the plurality of monitoring parameters) to extruder wear.

Preferably, the time interval between the first and the second time instant is less than one hour. Still more preferably, the time interval between the first and the second time instant is less than 30 minutes, or 20 minutes or 15 minutes. In effect, it should be noted that variations in the monitoring parameter in a long interval of time (weeks or months, for example) might be due to causes other than anomalies in the material: for example, extruder wear and, in particular, screw wear. Thus, the processing unit generates the alert signal only if (significant) variations in the monitoring parameter are detected in a time interval that is sufficiently short to exclude that such variations are due to wear.

In an embodiment, the processing unit is programmed to store a first succession of values for the monitoring parameter captured in succession one after the other and spaced by a first predetermined time interval. The first predetermined time interval is preferably less than or equal to 1 second. The first value of the monitoring parameter and the second value of the monitoring parameter are selected (by the processing unit) from among the values of the first succession. That way, it is possible to identify variations in the monitoring parameter which occur in brief transients (in the order of a few minutes) and which last for a longer time—for example, 10-15 minutes; for example, if a charge (or bag) of polymeric material is different from the preceding one, the monitoring parameter varies from a first value to a second value with a transient of a few minutes and then remains approximately constant at the second value until that charge (or bag) of polymeric material is finished (for example, 10-15 minutes).

The processing unit is programmed to derive, from the first succession of values, a second succession of values spaced by a second predetermined time interval; the second succession of values is a subset of the first succession of values and the second predetermined time interval is greater than the first predetermined time interval. Preferably, the second predetermined time interval is greater than 5 or 10 minutes; for example, the second predetermined time interval may be 10 or 15 minutes. Thus, the processing unit captures values measured in the first (shorter) time interval and, if no significant variations are detected, it may delete some of the data captured and keep in the memory only some of these values (precisely those spaced by the second predetermined time interval) to obtain information regarding the trend of the monitoring parameter. In effect, in an embodiment, the processing unit is configured to save to a database the second succession of values of the monitoring parameter (or of the plurality of monitoring parameters).

In an embodiment, the processing unit is programmed to process a plurality of different monitoring parameters. In this embodiment, the processing unit is configured to generate the alert data in response to a plurality of comparisons performed for the respective monitoring parameter of the plurality of monitoring parameters. These monitoring parameters are measured by the sensor system; in this case, the sensor system includes a plurality of sensors, each configured to measure a respective monitoring parameter of the plurality of monitoring parameters.

More specifically, the processing unit processes the plurality of monitoring parameters by comparing the value of each at the first time instant with the value at the second time instant. In this context, it should be noted that the more the monitoring parameters that vary significantly between the first and the second time instant (by more than a certain tolerance) the greater the probability that there really is an anomaly in the material; thus, the processing unit can generate alert data including an alert reliability level, which depends on the number of monitoring parameters whose variation between the first and the second time instant is significant—that is, greater than the respective tolerance threshold—(the greater the number of monitoring parameters with a significant variation, the higher the reliability of the alert). A more complex processing logic is also imaginable, where each monitoring parameter is assigned with a respective (predetermined) weight, such that the reliability of the alert is a function of the weighted average of the monitoring parameter variations between the first and the second time instant.

More specifically, the monitoring parameter (or the plurality of monitoring parameters) may include and/or be based on one or more of the following quantities (for example, it might include a combination of one or more of the following quantities, according to a predetermined formula):

p1) pressure of the molten polymeric material measured downstream of the pushing device;

p2) absorbed power of the motor that turns the extruder screw;

p3) speed of the extruder screw;

p4) absorbed power of the heaters;

p5) temperature of the molten polymeric material;

p6) electric power absorbed by the motor of the pushing device.

In this context it should be noted that the quantities denoted 'p1', 'p2', 'p4', 'p5' above, are particularly useful, in combination, for detecting errors in loading the thermoplastic material; the quantities 'p3' and 'p5', on the other hand, are particularly useful for detecting the state of wear of the extruder screw. Thus, for example, if the processing unit detects an unexpected variation in 'p5' and 'p3', the alert data will include a diagnostic information item indicating that the extruder screw is probably worn. On the other hand, if the processing unit detects an unexpected variation in one or more of the parameters 'p1', 'p2', 'p4', 'p5', the alert data will include a diagnostic information item indicating that there is a probable anomaly in the material.

The processing unit might also be configured to detect a fault in a mixer, configured to mix the molten material, in the event of an unexpected variation in 'p' and 'p6' but non significant variations in the other parameters (for example, one or more of the parameters 'p2-p5').

It should be noted that the recipe parameter (or the plurality of recipe parameters) may include and/or be based on one or more of the following quantities (for example, it might include a combination of one or more of the following quantities, according to a predetermined formula):

p7) extrusion cylinder temperature;

p8) speed at which the pushing device moves the molten polymeric material;

p9) pressure measured at an inlet zone of the pushing device.

More specifically, in the case where the pushing device includes a pump, the speed at which the pushing device moves the molten polymeric material represents the speed of the pump.

It should be noted that one or more monitoring parameters might coincide with one or more control parameters, on which the processing unit acts with a feedback control in order to bring the recipe parameter (or the recipe parameters) to the target value and keep it there. More specifically, the processing unit controls the speed of the extruder screw (quantity ‘p3’) by feedback to keep the pressure measured at an inlet zone of the pushing device (quantity ‘p9’) at the respective target value. In addition, or alternatively, the processing unit might control by feedback the power absorbed by the heaters (quantity ‘p4’) to keep the temperature of the extrusion cylinder (quantity ‘p7’) at the respective target value. In addition, or alternatively, the processing unit might control by feedback the electrical power absorbed by the pushing device (quantity ‘p6’) to keep the speed at which the pushing device moves the molten polymeric material (p8) at the respective target value.

It should be noted that, as described below with regard to the method (but this aspect applies to the device in the same way), the parameters ‘p7’-‘p9’ might be used as monitoring parameters and, instead, the parameters ‘p1’-‘p6’ might be used as recipe parameters.

In an embodiment, the processing unit is programmed to save records to a database, where each record comprises one or more of the following information items: a time instant of capture; the value of the recipe parameter (or of a combination of recipe parameters) at the time instant of capture; the value of the monitoring parameter (or of a combination of monitoring parameters) at the time instant of capture; data representing the type of polymeric material processed by the extruder at the time instant of capture. That way, it is possible to construct a database where each type of polymeric material and each recipe parameter (or combination of recipe parameters) is associated with a corresponding monitoring parameter (or plurality of monitoring parameters).

More specifically, the processing unit may be programmed to: receive a recipe which a user wishes to set, the recipe including data that represent the type of polymeric material to be processed and a target value for the recipe parameter; query the database for a record corresponding to the recipe to be set; (if such a record is found) compare a value of the monitoring parameter measured after setting the recipe, at the second time instant, with the value of the monitoring parameter contained in the record corresponding to the recipe, where the time instant of capturing the record constitutes the first time instant. In this context, it should be noted that the extruder is commonly used to process a plurality of different materials; it is thus possible for it to process a first material (for example, for a first week), then a second material (for example, for a second week) and then the first material again (for example, for a third week). When processing of the first material is resumed at the beginning of the third week, it is useful to compare the monitoring parameter (or the plurality of monitoring parameters) measured at the beginning of the third week with those of the first week, also relating to the first material. To do that, it is useful to have stored in the database the value of the monitoring parameter in the first week, associated with the data representing the type of polymeric material. It is also useful to have stored in the database the time instant of capturing the monitoring parameter because the longer the time that has elapsed after the time instant of capture, the greater the wear on the extruder (in effect, the wear might cause variations in the monitoring parameter without there being any anomalies in the thermoplastic material). In this context, the processing unit might also periodically save a new record for each recipe set.

Thus, in an embodiment, the value of the monitoring parameter (or the values of a vector of a plurality of monitoring parameters) is measured and stored in a backup memory connected to the processing unit at predetermined time instants (for example, every second). At each time instant, the processing unit can thus calculate a (moving) average of values adopted by the monitoring parameter in the time window preceding that time instant. Also, the processing unit may store the value of the monitoring parameter or its moving average, calculated at each time instant or at a subset of time instants.

In the event that an incorrect bag or silo of plastic is loaded, it has been observed that the variation in the monitoring parameter or the vector of a plurality of monitoring parameters occurs in a transient of the duration of a few minutes (for example, 5 or 10 minutes or more), after which the monitoring parameter, or the vector of a plurality of monitoring parameters, remains unchanged for a duration sufficient to finish the incorrect bag or silo, at the end of which it returns to its initial value (again with a transient of the duration of a few minutes).

Thus, in an embodiment, the processing unit may make a comparison periodically (at each measurement, every minute or every 5 minutes) between the moving average of the monitoring parameter calculated at a first time instant with the moving average of the monitoring parameter calculated at a second time instant, where the second time instant is the current time instant and the first time instant precedes the second time instant by a predetermined length of time (for example, 5 or 10 minutes). This comparison may be performed periodically while the same recipe is being made.

When the recipe stops being made, the processing unit stores in the database the data representing the value adopted by the monitoring parameter (or the plurality of monitoring parameters) during the time the recipe was the current recipe setting. More specifically, if there have been no significant variations in the monitoring parameter, the processing unit saves to the database a subset of the measured or calculated values of the monitoring parameter (or of its moving average) during the making of the recipe, associated with an information item indicating the time instant of capture, and deletes the other values (since there have been no significant variations); for example, it might save one value for each recipe, one value a day or one value a week. If there have been significant variations in the monitoring parameter, on the other hand (for example, if the monitoring parameter has had two markedly different values), the processing unit may also save to the database information representing these significant variations (for example, it may save the two markedly different values). The database thus contains a history of the values adopted by the monitoring parameter (or by the vector of the plurality of monitoring parameters); these data could be used for a comparison with new monitoring parameters that will be calculated the next time the same recipe is set (even if the extruder is used for other recipes in the meantime) and/or it could be useful to detect wear problems that have occurred since the recipe was last set. Furthermore, if values are saved at predetermined time intervals (for example, one value a day or one value a week), they allow monitoring slow drifting of the parameters due to wear.

In an embodiment, the processing unit might also derive a trend of the values of the monitoring parameter (or of the vector of the plurality of monitoring parameters) measured or calculated in succession, one after the other (for example, every second) and derive the alert data based on a function analysis of that trend. In this case, too, when the recipe stops being made, if there have been no significant variations, the processing unit could save to the database a subset of the measured or calculated values of the monitoring parameter (or of its moving average) during the making of the recipe, associated with an information item indicating the time instant of capture, and could delete the other values.

In an embodiment, there might not be any recipe and even the parameters based on the quantities p7-p9 might be monitoring parameters measured by the sensor system. In this case, the processing unit may be configured to save records to a database, where each record comprises values of one or more of the monitoring parameters measured by the sensor system (that is, a vector of parameters representing the above listed quantities ‘p1-p6’ and/or ‘p7-p9’) associated with data representing the type of polymeric material being processed at the time instant of capture. Thus, the database may contain a fingerprint of each type of polymeric material and may be used to recognize the type of polymeric material being processed by the extruder (even in the absence of variations in the monitoring parameters between different time instants). In effect, if the processing unit knows the value of one or more of the monitoring parameters representing the quantities ‘p1-p6’ and/or ‘p7-p9’ measured by the sensor system, it can identify the type of polymeric material from the data stored in the database. In this context, this disclosure can also provide a method for deriving diagnostic information regarding the type of polymeric material being processed by the extruder.

More specifically, the processing unit may be configured to work in a self-learning mode in which, at a plurality of successive time instants, it receives a vector of monitoring parameters, measured by the sensor system, and information regarding the type of material, communicated by the user. The processing unit can thus generate a connection (or correlation) between the vector of monitoring parameters and the type of material. This connection may be derived by an artificial intelligence system integrated in the processing unit and including, for example, neural networks. Alternatively, the connection may be obtained from rules communicated by the user, based on human knowledge. After building a self-learning database including values adopted over a certain period of time by the vector of monitoring parameters associated with a type of material, the processing unit can work in an identification mode in which it receives a vector of monitoring parameters, measured by the sensor system, and can identify the type of material being processed. Identification may be based on calculations of proximity between the values of the vector of measured monitoring parameters and the values of the vector of monitoring parameters stored in the self-learning database.

In an embodiment, the processing unit might derive diagnostic information on the basis of one or more pairs of monitoring parameters measured by the sensor system—that is, by comparing the value of a parameter of one pair with the value of the other parameter of the same pair. More specifically, the one or more pairs of monitoring parameters may include parameters representing the following pairs of quantities:

- absorbed power of the motor that turns the extruder screw (‘p2’) and speed of the extruder screw (‘p3’);
- absorbed power of the heaters (‘p4’) and temperature of the extrusion cylinder (‘p7’);
- electric power absorbed by the motor of the pushing device (‘p6’) and speed of the pushing device (‘p8’).

It should be noted that the values adopted by the monitoring parameters normally have a variation in a start-up transient of the extruder; this start-up transient has a duration of approximately 10-15 minutes from the moment of power-on. In an embodiment, the processing unit might be configured to recognize the type of polymeric material being processed, based on the trend of variation of the monitoring parameter (or of the plurality of monitoring parameters) at start-up. More specifically, the database may contain, for each type of material, a plurality of data representing the trend of variation of the monitoring parameter (or of the plurality of monitoring parameters) at start-up; based on a comparison between the measured monitoring parameter (or the plurality of monitoring parameters) with the data in the database, the control unit can identify the type of material being processed.

It should be noted that this disclosure also provides a diagnostic system for an extruder. This diagnostic system comprises a processing unit according to one or more aspects of this disclosure. The diagnostic system may also comprise a sensor system according to one or more aspects of this disclosure, connectable to an extruder according to one or more aspects of this disclosure.

This disclosure also relates to a method for performing a diagnostic investigation in an extruder for polymeric materials. The extruder is made according to one or more aspects of this disclosure. The method for performing the diagnostic investigation comprises a step of capturing a monitoring parameter.

The monitoring parameter may be different from the recipe parameter but it may also coincide with the recipe parameter. In an example embodiment, a plurality of monitoring parameters is used; also used is a plurality of recipe parameters. Preferably, at least one of the monitoring parameters is different from the parameters used as recipe parameters; in an embodiment, the monitoring parameters are all different from the parameters used as recipe parameters.

In an embodiment, diagnostic information could be derived by analysing the trend of one or more monitoring parameters also used as recipe parameters. In effect, the processing unit captures the value of the recipe parameters, compares them with the respective target values and, if a significant difference is found, acts on at least one control parameter to bring the recipe parameters back to the proximity of the respective target values (plus or minus predetermined tolerances); from the moment the processing unit operates on the control parameter, a transient is started in which the recipe parameters approach the respective target values; by analysing the trend of the recipe parameter values in this transient, it is possible to derive diagnostic information useful, for example, to generate the alert data; in this case, therefore, a single parameter can be used both as a monitoring parameter and as a recipe parameter.

The parameter (or parameters) to be used as monitoring parameter and the parameter (or parameters) to be used as recipe parameter can be selected according to several methods which, in principle, might also change according to the application (for example, depending on the type of machine that is connected to the extruder—that is, on the type of treatment applied to the plastic provided by the extruder) or even depending on the recipes. Thus each of the above mentioned parameters ‘p1’-‘p9’ might be used, depending on the application, as monitoring parameter, as recipe parameter or as both monitoring parameter and recipe parameter.

For example, if the extruder is used to supply molten material to a machine provided with a pushing device, such as, for example, an (injection or compression) moulding machine, the parameters denoted ‘p1’, ‘p2’, ‘p3’, ‘p4, ‘p5’, ‘p6’ above can be used as monitoring parameters and the parameters denoted’p7’, ‘p8’, e ‘p9’ above can be used as recipe parameters. The feedback control may be performed on the parameters ‘p4’, ‘p3’, ‘p6’, which thus also act as control parameters.

In another embodiment, in which the extruder is used to feed molten material to a machine without a pushing device such as, for example, an (injection or compression) moulding machine without a pushing device or a lining machine, a parameter ‘p1*’ (indicating the pressure of the molten polymeric material measured downstream of the extruder) and the parameters ‘p2’, ‘p4’ and ‘p5’ can be used as monitoring parameters, and the parameters ‘p3’ and ‘p7’ can be used as recipe parameters. In this case, the parameters ‘p2’ and ‘p4’ can be used as control parameters and thus act as both monitoring parameters and control parameters. In this case, the parameters ‘p6’ and ‘p8’ are not present and the parameters ‘p1’ and ‘p9’ coincide (that is to say, they are a single parameter ‘p1*’).

The method comprises capturing the monitoring parameter at successive time instants. To perform the diagnostic investigation, the method comprises a step of processing a first value of the monitoring parameter, measured at a first time instant, and a second value of the monitoring parameter, measured at a second time instant, after the first time instant. To perform the diagnostic investigation, the method comprises a step of generating alert data in response to a comparison between the first and the second value of the monitoring parameter.

More specifically, processing may comprise making a comparison between an intensity of variation of the monitoring parameter from the first to the second value and reference data.

Preferably, the step of generating alert data is also responsive to verifying the fact that the target value for the recipe parameter has remained unchanged between the first and the second time instant. If the target value for the recipe parameter varies, on the other hand, it is normal to have a variation in the monitoring parameter.

In one or more embodiments, a plurality of monitoring parameters are measured; the step of generating alert data is responsive to a step of processing corresponding variations over time in the value of the monitoring parameters of the plurality of monitoring parameters, according to a predetermined logic.

To perform the diagnostic investigation, the method, in an embodiment of it, comprises a step of saving records to a database, where each record comprises one or more of the following information items: a time instant of capture; the value of the recipe parameter at the time instant of capture; the value of the monitoring parameter at the time instant of capture; data representing the type of polymeric material processed by the extruder at the time instant of capture.

In an embodiment, receiving a recipe which a user wishes to set triggers a step of querying the database for a record corresponding to the recipe to be set. More specifically, the recipe includes data representing the type of polymeric material to be processed and the target value for the recipe parameter. If such a record is found, the method includes a step of comparing a value of the monitoring parameter (or of a plurality of monitoring parameters) measured after the recipe has been set, at the second time instant, with the value of the monitoring parameter (or of the plurality of monitoring parameters) contained in the record corresponding to the recipe selected from the database; in this context, the time instant of capturing the record constitutes the first time instant; thus, the method comprises generating the alert data if the monitoring parameter measured differs significantly from the stored value of the monitoring parameter. If no such record is found, on the other hand, the method triggers a step of self-learning in which it is made ready to update the database with a new record.

This disclosure also provides a computer program comprising instructions executable by a processor to implement the steps of the method for performing a diagnostic investigation in an extruder for polymeric materials according to this disclosure.

This disclosure provides a method for extruding polymeric materials. The method for extruding polymeric materials comprises a step of receiving pellets of polymeric material at an inlet of an extrusion cylinder. The method for extruding polymeric materials comprises a step of rotating an extruder screw in the extrusion cylinder to move the polymeric material from the inlet towards an outlet. The method for extruding polymeric materials comprises a step of heating the polymeric material in the hollow cylinder while the material is being moved from the inlet to the outlet. Heating is performed by heaters associated with the cylinder. The method for extruding polymeric materials comprises a step of expelling molten polymeric material through the outlet of the cylinder. The method for extruding polymeric materials comprises a step of moving the molten polymeric material expelled through the outlet of the cylinder—that is, fed by the extruder screw—to make it available to a moulding machine for making polymeric objects. The method for extruding polymeric materials comprises a step of capturing a recipe parameter and a monitoring parameter. The method for extruding polymeric materials also comprises a step of performing a feedback control on the heaters (or more generally speaking, on a control parameter of the extruder), so as to bring the recipe parameter to a previously stored target value and keep it there. The method for extruding polymeric materials comprises one or more steps of the method for performing a diagnostic investigation in an extruder, according to one or more aspects of this disclosure.

This disclosure provides a method for extruding polymeric materials through an extrusion cylinder, which receives pellets of polymeric material through its inlet and which is provided with heaters, an extruder screw, which rotates inside the extrusion cylinder to move the polymeric material from the inlet towards an outlet of the extrusion cylinder, and a pushing device for moving the molten polymeric material expelled through the outlet of the extrusion cylinder and making it available to a moulding machine for making polymeric objects, the method comprising the following steps:

- setting a target value for a recipe parameter;
- capturing values for the recipe parameter (in real time);
- performing a feedback control on the heaters (or more generally speaking, on a control parameter of the extruder), so as to bring the recipe parameter to a previously stored target value and keep it there;

capturing a monitoring parameter (preferably, different from the recipe parameter);

processing the monitoring parameter;

generating alert data in response to a comparison between the first and the second value of the monitoring parameter.

In an embodiment, processing the monitoring parameter includes processing a first value of the monitoring parameter, measured at a first time instant, and a second value of the monitoring parameter, measured at a second time instant, after the first time instant. In another embodiment, a (first) value of the monitoring parameter (preferably measured in real time) is processed by comparing it with reference data—contained in a knowledge base, for example; in this case, a plurality of monitoring parameters are preferably processed; furthermore, in an example embodiment, the monitoring parameter (or the monitoring parameters) is processed jointly with the recipe parameter.

It should be noted that the steps of setting, capturing the recipe parameter and performing a feedback control are performed by the processor in a processing unit; the steps of processing and generating may be performed by the processor of the same processing unit or by a further processor of a further processing unit.

According to an aspect of it, this disclosure provides a computer program containing instructions to perform the above mentioned steps of the method, when performed on the aforesaid processor (or on the processor and on the further processor).

BRIEF DESCRIPTION OF DRAWINGS

These and other features will become more apparent from the following description of a preferred embodiment, illustrated by way of non-limiting example in the accompanying drawings, in which.

DETAILED DESCRIPTION OF PREFERRED EMBODIMENTS OF THE INVENTION

Figure 1:
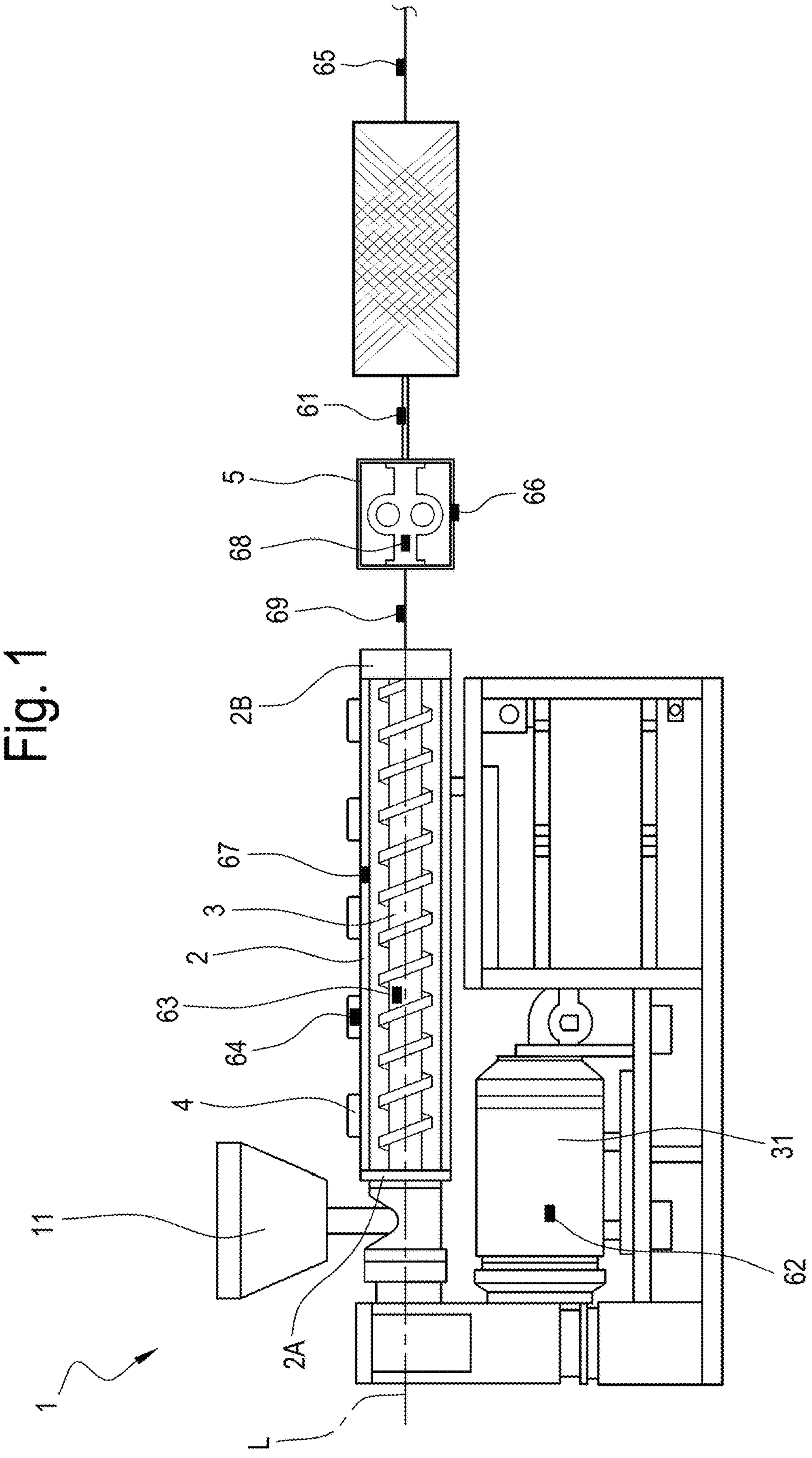
FIG. 1 illustrates an embodiment of the extruder of this disclosure, where the extruder is configured to feed molten thermoplastic material to a compression moulding machine.
Figure 2:
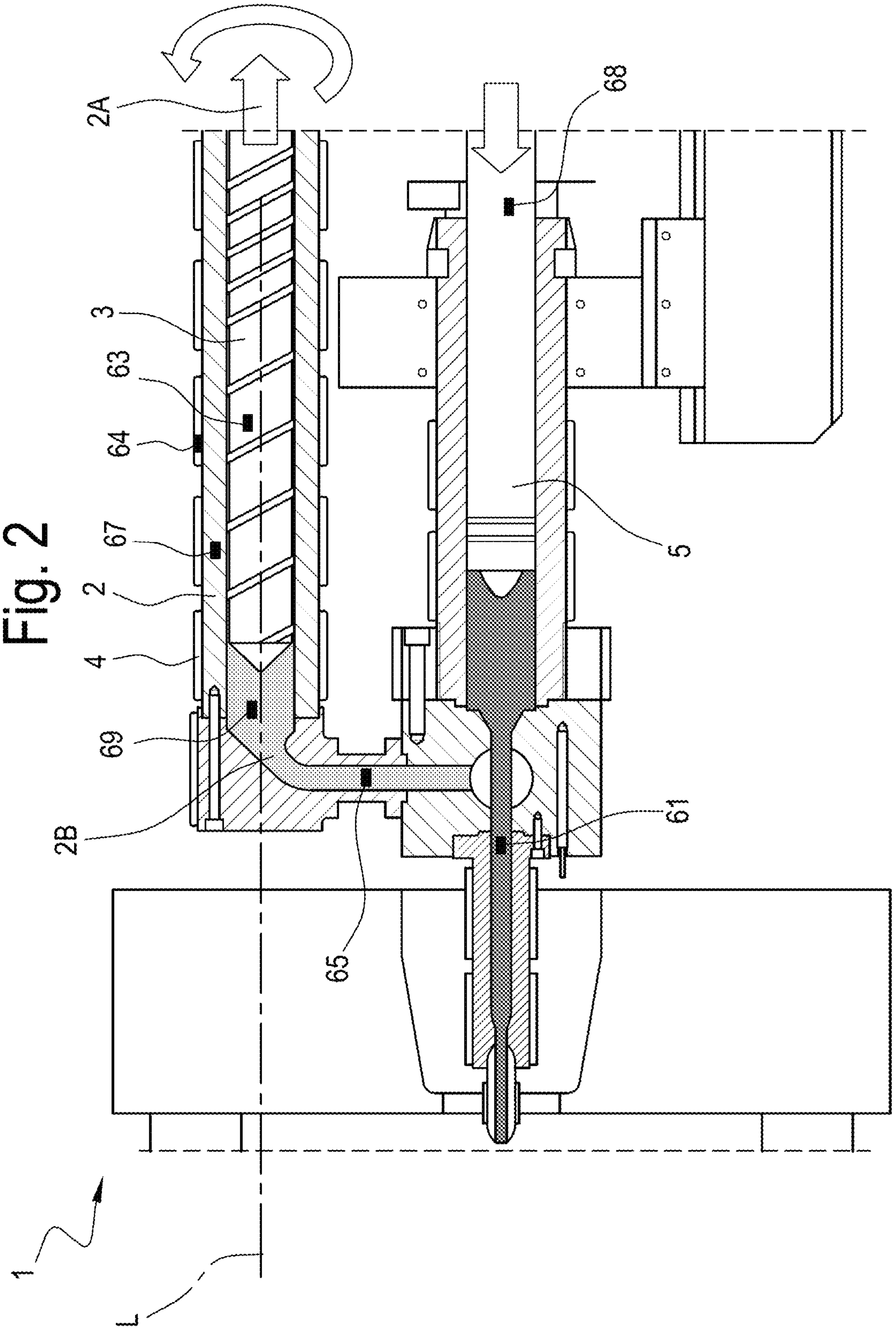
FIG. 2 illustrates a further embodiment of the extruder of this disclosure, where the extruder is configured to feed molten thermoplastic material to an injection moulding machine, in an operating configuration in which the extruder screw is at the withdrawn position.
Figure 3:
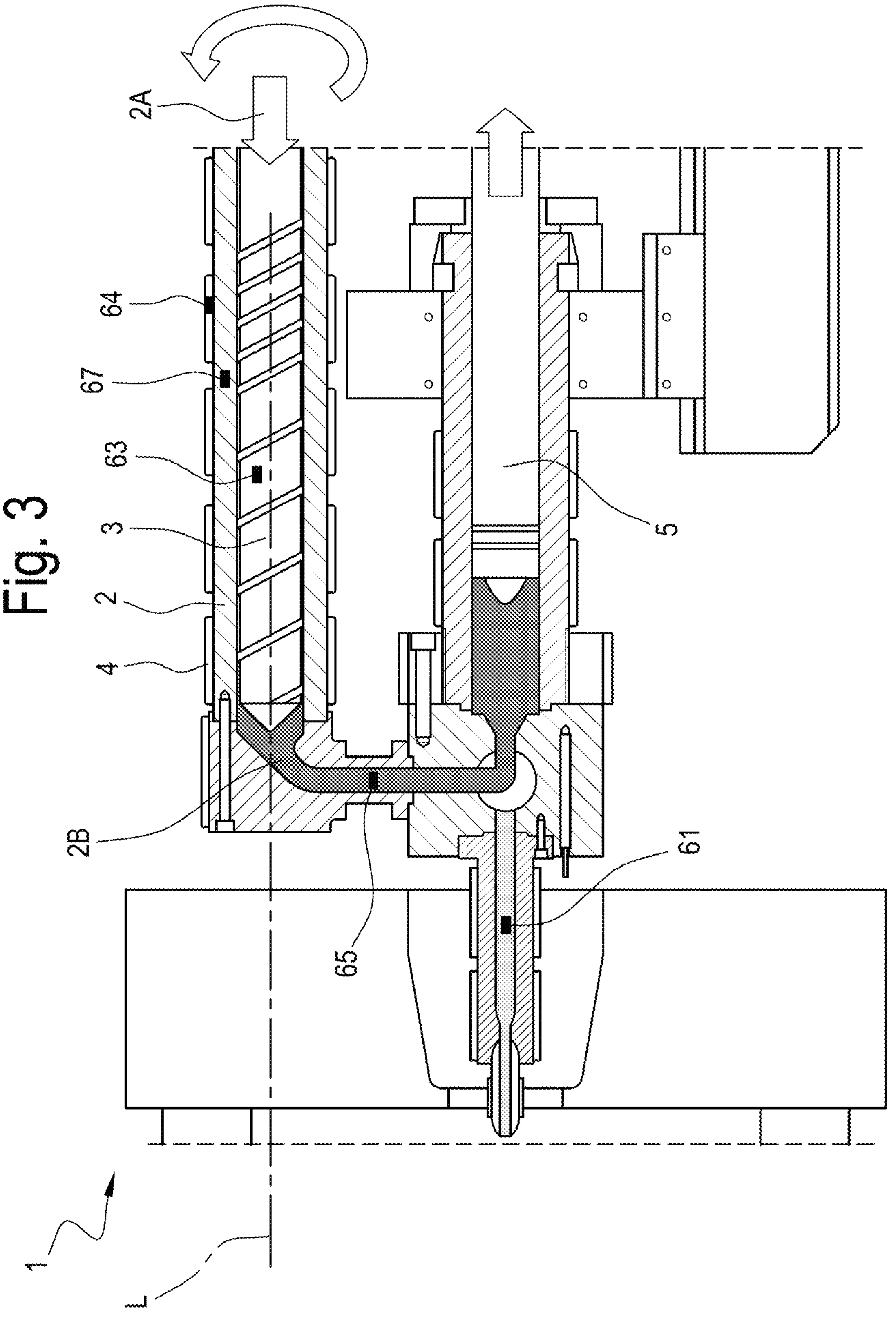
FIG. 3 illustrates the extruder of FIG. 2 in an operating configuration in which the extruder screw is at the advanced position.
Figure 4:
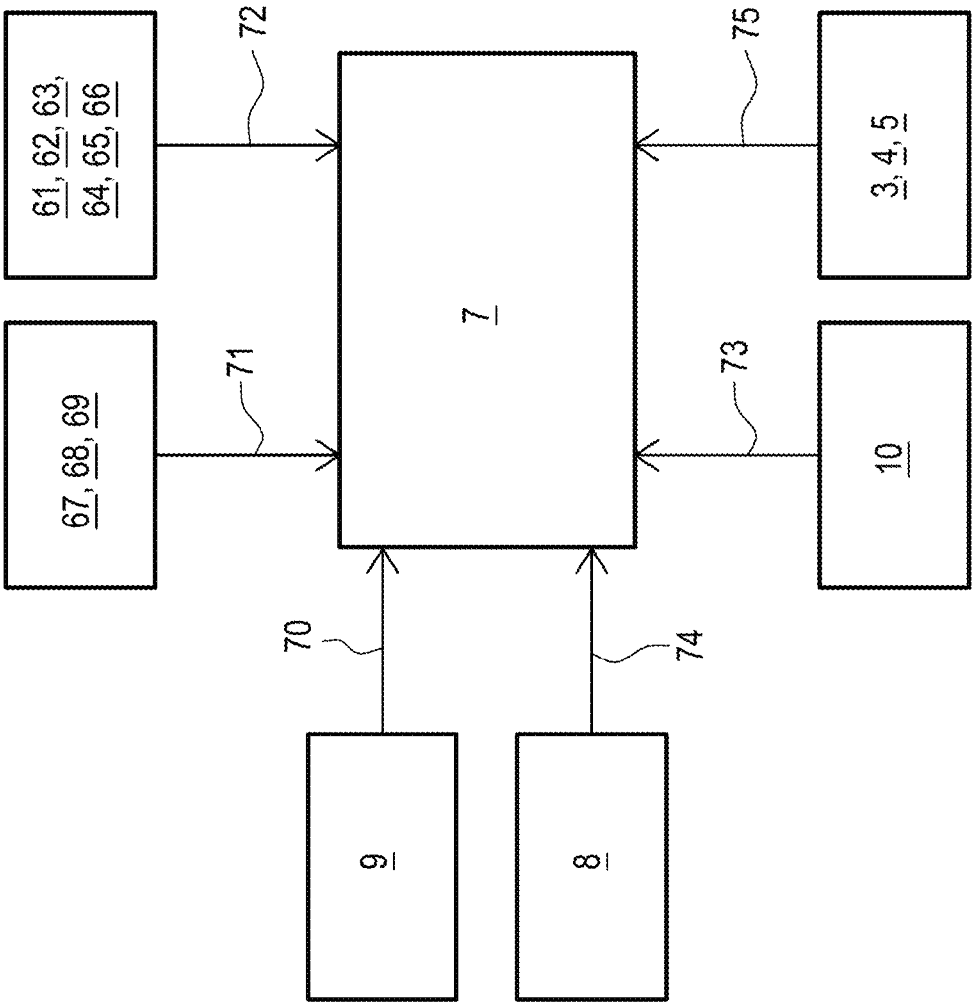
FIG. 4 schematically illustrates a processing unit of the extruder of FIG. 1 or of FIG. 2.

With reference to the accompanying drawings, the numeral 1 denotes an extruder. The extruder 1 comprises a hollow extrusion cylinder 2. The extrusion cylinder 2 extends in a longitudinal direction between an inlet 2A and an outlet 2B. The extrusion cylinder 2 is configured to receive pellets of polymeric material through the inlet 2A and to expel molten polymeric material through the outlet 2B.

The extruder 1 comprises a loading hopper 11, configured to feed pellets of polymeric material to the inlet 2A of the extrusion cylinder 2.

The extruder 1 also comprises an extruder screw 3; the extruder screw 3 is positioned inside the extrusion cylinder 2 and is rotatable relative thereto. The extruder screw 3 also extends in the longitudinal direction L. The extruder 1 comprises a motor 31 (preferably electric) configured to make the extruder screw 31 rotate on itself.

The extruder 1 comprises one or more heaters 4. The one or more heaters 4 are coupled to the extrusion cylinder 2. The extrusion cylinder 2 is made of a material with high thermal conductivity such as metal, for example, and specifically, steel; thus, the heaters 4 are configured to heat the material the extrusion cylinder 2 is made of, which in turn heats the thermoplastic material contained therein.

The extruder 1 also comprises a pushing device 5. The pushing device 5 is connected downstream of the extrusion cylinder 2 to move the material leaving the outlet 2B of the extrusion cylinder 2 and to expel it from the extruder 1. In an embodiment, the pushing device 5 includes a pump which is connected downstream of the outlet 2B of the extrusion cylinder 2. In this embodiment, the pushing device 5 is configured to move the thermoplastic or polymeric material leaving the extrusion cylinder 2 continuously; thus, the extruder screw 3 rotates continuously about the longitudinal axis L so that the extrusion cylinder 2 expels material through its outlet 2B continuously. This embodiment is used in extruders configured to feed compression moulding machines.

In an embodiment, the pushing device 5 includes a piston that moves with reciprocating motion inside a cylinder, from a withdrawn position to an advanced position. Inside the cylinder 2, the piston delimits an injection chamber which is in fluid connection with the outlet 2B of the extrusion cylinder 2. More specifically, the extruder includes a first duct that extends from the outlet 2B of the extrusion cylinder 2, and a second duct that extends from the injection chamber; the first and second ducts merge into an outlet duct configured to expel the molten polymeric material. The extruder screw 3 is rotatable inside the extrusion cylinder 2 about the longitudinal axis L and is also movable by translation along the longitudinal axis L, between a withdrawn position and an advanced position. Initially, the extruder screw 3 is at the withdrawn position and the piston of the pushing device 5 is at the advanced position. As the extruder screw 3 rotates the extruder screw 3 also moves along the longitudinal direction L from the withdrawn position to the advanced position and, at the same time, the piston of the pushing device 5 moves from the advanced position to the withdrawn position so the material leaving the outlet 2B of the extrusion cylinder 2 invades the injection chamber; at this stage, the material is prevented from flowing into the outlet duct by a valve which blocks its passage. After a predetermined length of time from when the extruder screw 3 starts rotating, the extruder screw 3 is stopped and the piston is moved from the withdrawn position to the advanced position by a specific motor; thus, as the piston moves to the advanced position, it pushes the molten material, which has in the meantime filled the injection chamber, into the outlet duct; at this stage, the valve has been opened and allows the material to flow into the outlet duct; while the piston is moving from the withdrawn position to the advanced position, the extruder screw 3 moves along the longitudinal axis from the advanced position to the withdrawn position; when all the molten material has been expelled, another cycle starts. This embodiment is used in extruders configured to feed injection moulding machines.

The extruder 1 also comprises a sensor system. The sensor system comprises one or more of the following sensors:

Outlet pressure sensor 61, configured to measure the pressure of the thermoplastic material at the outlet of the pushing device 5;

Screw power sensor 62, configured to measure the electric power absorbed by the electric motor 31 which drives the extruder screw 3;

Screw speed sensor 63, configured to measure the rotation speed of the extruder screw 3;

Heater power sensor 64, configured to measure the electric power absorbed by the heaters 4;

Molten material temperature sensor 65, configured to measure the temperature of the molten polymeric material leaving the extruder;

Pushing device power sensor 66, configured to measure the electric power absorbed by the pushing device 5;

Cylinder temperature sensor 67, configured to measure the temperature of the extrusion cylinder 2;

Pushing device speed sensor 68, configured to measure the speed of the pushing device 5;

Inlet pressure sensor 69, configured to measure the pressure of the molten thermoplastic material at the inlet of the pushing device 5.

The outlet pressure sensor 61 is connected to an outlet duct which receives the molten material leaving the extrusion cylinder 2, downstream of the pushing device 5. The screw power sensor 62 is connected to the motor 31 that drives the extruder screw 3. The screw speed sensor 63 is connected to the extruder screw 3. The heater power sensor 64 is connected to the heaters 4. The molten material temperature sensor 65 is connected to an outlet duct which receives the molten material leaving the extrusion cylinder 2. The pushing device power sensor 66 is connected, in the case where the pushing device 5 comprises a pump, to the motor that drives the pump, and, in the case where the pushing device 5 comprises a piston movable inside a cylinder, to the motor that drives the piston. The cylinder temperature sensor 67 is connected to the cylinder 2. The pushing device speed sensor 68 is connected to the pump in the case where the pushing device 5 comprises a pump, and to the piston in the case where the pushing device 5 comprises a piston movable inside a cylinder. The inlet pressure sensor 69 is connected to a duct which receives the molten material from the outlet 2B of the cylinder 2, upstream of the pushing device 5 (that is, upstream of the pump, in the case where the pump is provided, or upstream of the point of connection between the first duct, connected to the outlet 2B, and the second duct, connected to the injection chamber, in the case where the piston slidable in the cylinder is provided).

The sensors 61, 62, 63, 64, 65, 66 are each configured to measure a respective monitoring parameter 72. More specifically, the outlet pressure sensor 61 is configured to measure a monitoring parameter 72 representing the quantity 'p1'. The screw power sensor 62 is configured to measure a monitoring parameter 72 representing the quantity 'p2'. The screw speed sensor 63 is configured to measure a monitoring parameter 72 representing the quantity 'p3'. The heater power sensor 64 is configured to measure a monitoring parameter 72 representing the quantity 'p4'. The molten material temperature sensor 65 is configured to measure a monitoring parameter 72 representing the quantity 'p5'. The pushing device power sensor 66 is configured to measure a monitoring parameter 72 representing the quantity 'p6'. Preferably, at least two of the sensors 61, 62, 63, 64, 65, 66 are provided, hence at least two monitoring parameters 72 are measured.

The sensors 67, 68, 69 are each configured to measure a respective recipe parameter 71. More specifically, the cylinder temperature sensor 67 is configured to measure a recipe parameter 71 representing the quantity 'p7'. The pushing device speed sensor 68 is configured to measure a recipe parameter 71 representing the quantity 'p8'. The inlet pressure sensor 69 is configured to measure a recipe parameter 71 representing the quantity 'p9'.

The extruder 1 comprises a processing unit 7. The processing unit 7 is programmed to receive one or more recipe parameters 71 from the sensors 67, 68, 69. The extruder 1 also comprises a user interface 9, configured to allow a user to select a target value 70 for each recipe parameter 71. The processing unit 7 is connected to the user interface 9 to receive, for each recipe parameter 71, the respective target value 70 selected by the user.

The processing unit 7 is configured to compare the one or more recipe parameters 71 measured by the sensors 67, 68, 69 (or by one or more of them) with the corresponding target values 70 and to generate one or more feedback control signals 75 as a function of a difference between the one or more recipe parameters 71 measured and the corresponding target values 70. The processing unit 7 is configured to send the one or more feedback control signals 75 to one or more of the following components of the extruder: extruder screw 3, heaters 4, pushing device 5. More specifically, the processing unit 7 can send a feedback control signal 75 to the heaters 4 to vary the power absorbed by the heaters 4 (quantity 'p4'); the processing unit 7 can send a feedback control signal 75 to the extruder screw 3, specifically to the electric motor 31, to vary the rotation speed of the extruder screw 3 (quantity 'p3'); the processing unit 7 can send a feedback control signal 75 to the pushing device 5, specifically to the motor of the pushing device 5, to vary the power absorbed by the motor of the pushing device 5 (quantity 'p6'). Thus, the quantities 'p4', 'p3' and 'p5' are read by the sensors 64, 63 and 65, respectively, and thus constitute monitoring parameters; at the same time, they can be controlled by feedback so that the one or more recipe parameters 71 remain equal or close to the respective target values 70.

The processing unit 7 is programmed to process values of each monitoring parameter 72 captured at successive time instants. More specifically, the processing unit 7 is configured to process a first value of each monitoring parameter 72, measured at a first time instant, and a second value of the same monitoring parameter 72, measured at a second time instant, after the first time instant. The processing unit 7 is programmed to generate alert data 73, in response to a comparison between the first and the second value of each monitoring parameter 72. In an embodiment, the processing unit 7 is configured to generate the alert data 73 if, for at least one monitoring parameter 72 (or, preferably for at least two monitoring parameters 72), there is a significant difference (greater than a predetermined tolerance threshold) between the first and the second value. The alert data 73 may indicate an anomaly in the operation of the extruder 1. In an embodiment, the extruder 1 comprises an alarm system (or output interface) 10 and the processing unit 7 is configured to send the alert data 73 to the alarm system 10.

In an embodiment, the processing unit 7 has access to a memory 8 (which may form part of the extruder 1 itself, or may be a remote memory); the memory 8 may contain reference data 74 representing an intensity of variation of each monitoring parameter 72 (that is, a tolerance threshold for the intensity of variation). The processing unit 7 is configured to receive the reference data 74 and to generate the alert data in response to a comparison between the variation of each monitoring parameter 72 from the first to the second value and the respective reference data 74.

It should be noted that in the case where the pushing device 5 comprises a reciprocating piston in a cylinder, some monitoring parameters 72, such as, for example, the pressure of the molten polymeric material measured downstream of the pushing device, have a cyclic trend; thus, the first and the second value are measured at corresponding time instants of different cycles; the reference data 74 are also referred to the cycle time instant at which the values of the monitoring parameters 72 are measured.

The invention claimed is:

1. An extruder for polymeric materials, comprising:
- a hollow extrusion cylinder, extending along a longitudinal direction and having an inlet for receiving pellets of polymeric material, and an outlet for expelling molten polymeric material;
- an extruder screw connected to a motor to rotate inside the extrusion cylinder and to move the polymeric material from the inlet to the outlet;
- heaters coupled to the extrusion cylinder;
- a sensor system configured to measure values of a recipe parameter and of a monitoring parameter;
- a processing unit, programmed to store a target value for the recipe parameter and to perform a feedback control on the heaters to bring the recipe parameter to the target value and to keep it there,
- wherein the processing unit is programmed to process a first value of the monitoring parameter, measured at a first time instant, and a second value of the monitoring parameter, measured at a second time instant, after the first time instant, and is programmed to generate alert data in response to a comparison between the first and the second value of the monitoring parameter,
- wherein the processing unit is programmed to store a first succession of values for the monitoring parameter captured in succession one after the other and spaced by a first predetermined time interval, wherein the first value of the monitoring parameter and the second value of the monitoring parameter are selected from the values of the first succession, and
- wherein the processing unit is programmed to derive, from the first succession of values, a second succession of values, spaced by a second predetermined time interval, wherein the second succession of values is a subset of the first succession of values and wherein the second predetermined time interval is greater than the first predetermined time interval.

2. The extruder according to claim 1, wherein the processing unit has access to a memory containing reference data representing an intensity of variation in the monitoring parameter and wherein the processing unit is programmed to generate the alert data in response to comparing the variation between the first and the second value of the monitoring parameter with the reference data.

3. The extruder according to claim 2, wherein the processing unit is programmed to detect variations in the target value for the recipe parameter and to generate alert data also as a function of an absence of variations in the target value for the recipe parameter between the first and the second time instant.

4. The extruder according to claim 1, wherein the processing unit is programmed to generate the alert data also as a function of a duration of the time interval between the first and the second time instant.

5. The extruder according to claim 1, wherein the processing unit is programmed to process a plurality of different monitoring parameters and to generate the alert data in response to a corresponding plurality of comparisons performed for the respective monitoring parameters of the plurality of monitoring parameters.

6. The extruder according to claim 1, wherein the processing unit is programmed to save records to a database, wherein each record comprises the following information items:
- a time instant of capture;
- the value of the recipe parameter at the time instant of capture;
- the value of the monitoring parameter at the time instant of capture;
- data representing the type of polymeric material processed by the extruder at the time instant of capture.

7. The extruder according to claim 6, wherein the processing unit is programmed to
- receive a recipe which a user wishes to set, the recipe including data representing the type of polymeric material to be processed and a target value for the recipe parameter,
- query the database for identifying a record corresponding to the recipe to be set,
- compare a value of the monitoring parameter measured after setting the recipe, at the second time instant, with the value of the monitoring parameter contained in the record corresponding to the recipe, where the time instant of capturing the record constitutes the first time instant.

8. The extruder according to claim 1, wherein the monitoring parameter is based on one or more of the following quantities:
- pressure of the molten polymeric material measured downstream of the extruder screw;
- temperature of the molten polymeric material;
- absorbed power of the motor that turns the extruder screw;
- absorbed power of the heaters;
- temperature of the extrusion cylinder;
- speed of the extruder screw.

9. The extruder according to claim 1, wherein the recipe parameter is based on one or more of the following quantities:
- temperature of the extrusion cylinder;
- speed at which the polymeric material is moved out of the extruder screw;
- pressure measured at the outlet of the extrusion cylinder.

10. The extruder according to claim 1, comprising a pushing device, configured to move the molten polymeric material fed by the extruder screw, to make it available to a moulding machine for making polymeric objects, wherein one or more of the following conditions are true:
- i) the monitoring parameter is based on the pressure of the molten polymeric material measured downstream of the pushing device;
- ii) the recipe parameter is based on one or more of the following quantities:
  - speed at which the pushing device moves the molten polymeric material;
  - pressure measured at an inlet zone of the pushing device.

11. The extruder according to claim 1, wherein the processing unit is programmed to generate the alert data also as a function of a duration of the time interval between the first and the second time instant,
- wherein the monitoring parameter is based on the following quantities;
  - a speed of the extruder screw, and
  - a temperature of the molten polymeric material, and
- wherein the alert data includes a diagnostic information item indicating whether the extruder screw is worn.

12. The extruder according to claim 1, wherein the monitoring parameter is based on the following quantities:

pressure of the molten polymeric material measured downstream of the extruder screw; and temperature of the molten polymeric material, and wherein the alert data includes a diagnostic information item indicating whether there is an anomaly in the material.

13. A method for performing a diagnostic investigation in an extruder for polymeric materials, wherein the extruder comprises:

an extruder screw connected to a motor to rotate inside an extrusion cylinder provided with heaters and to move the polymeric material from an inlet to the outlet, causing the polymeric material to melt;

a sensor system for measuring a recipe parameter;

a processing unit, programmed to store a target value for the recipe parameter and to perform a feedback control on the heaters to bring the recipe parameter to the target value and to keep it there, the method comprising the following steps:

measuring a monitoring parameter;

processing a first value of the monitoring parameter, measured at a first time instant, and a second value of the monitoring parameter, measured at a second time instant, after the first time instant;

-generating alert data in response to a comparison between the first and the second value of the monitoring parameter, storing a first succession of values for the monitoring parameter captured in succession one after the other and spaced by a first predetermined time interval, wherein the first value of the monitoring parameter and the second value of the monitoring parameter are selected from the values of the first succession, and deriving, from the first succession of values, a second succession of values, spaced by a second predetermined time interval, wherein the second succession of values is a subset of the first succession of values and wherein the second predetermined time interval is greater than the first predetermined time interval.

14. The method according to claim 13, wherein the step of processing comprises making a comparison between an intensity of variation of the monitoring parameter from the first to the second value and reference data.

15. The method according to claim 14, wherein the step of generating alert data is also responsive to verifying the fact that the target value for the recipe parameter has remained unchanged between the first and the second time instant.

16. The method according to claim 13, wherein a plurality of monitoring parameters are measured and wherein the step of generating the alert data is responsive to a step of processing corresponding variations over time in the value of the monitoring parameters of the plurality of monitoring parameters, according to a predetermined logic.

17. The method according to claim 13, comprising a step of saving records to a database, wherein each record comprises one or more of the following information items:

a time instant of capture;

the value of the recipe parameter at the time instant of capture;

the value of the monitoring parameter at the time instant of capture;

data representing the type of polymeric material processed by the extruder at the time instant of capture.

18. The method according to claim 17, comprising a step of receiving a recipe which a user wishes to set, and which includes data representing the type of polymeric material to be processed and the target value for the recipe parameter, triggers a step of querying the database for a record corresponding to the recipe to be set, and wherein, in the case where such a record is found, the method includes a step of comparing a value of the monitoring parameter measured after setting the recipe, at the second time instant, with the value of the monitoring parameter contained in the record corresponding to the recipe selected from the database, where the time instant of capturing the record constitutes the first time instant, if no such record is found, the method triggers a step of self-learning in which it is made ready to update the database with a new record.

19. An extruder for polymeric materials, comprising:

a hollow extrusion cylinder, extending along a longitudinal direction and having an inlet for receiving pellets of polymeric material, and an outlet for expelling molten polymeric material;

an extruder screw connected to a motor to rotate inside the extrusion cylinder and to move the polymeric material from the inlet to the outlet;

heaters coupled to the extrusion cylinder;

a sensor system configured to measure values of a recipe parameter and of a monitoring parameter;

a processing unit, programmed to store a target value for the recipe parameter and to perform a feedback control based on the recipe parameter, wherein the processing unit is programmed to process a first value of the monitoring parameter, measured at a first time instant, and a second value of the monitoring parameter, measured at a second time instant, after the first time instant, and is programmed to generate alert data in response to a comparison between the first and the second value of the monitoring parameter, and wherein the processing unit is programmed to store a first succession of values for the monitoring parameter in succession captured one after the other and spaced by a first predetermined time interval, wherein the first value of the monitoring parameter and the second value of the monitoring parameter are selected from the values of the first succession, wherein the processing unit is programmed to derive a second succession of values, spaced by a second predetermined time interval, and wherein the second predetermined time interval is greater than the first predetermined time interval.

20. The extruder according to claim 19, wherein consecutive values of the first succession of values for the monitoring parameter are spaced in time by a first predetermined time interval.

* * * * *